(12) United States Patent
Tanaka et al.

(10) Patent No.: US 7,054,145 B2
(45) Date of Patent: *May 30, 2006

(54) MECHANISM FOR ADJUSTING A DISPLAY

(75) Inventors: Toshiyuki Tanaka, Laguna Niguel, CA (US); Hiroyuki Kusaka, Tokyo (JP); Aage Granaas, Redwood City, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 10/716,859

(22) Filed: Nov. 18, 2003

(65) Prior Publication Data

US 2005/0105252 A1    May 19, 2005

(51) Int. Cl.
*H05K 5/00* (2006.01)

(52) U.S. Cl. .................. 361/679; 361/681; 361/683

(58) Field of Classification Search ............. 361/680, 361/681, 683
See application file for complete search history.

(56) References Cited

U.S. PATENT DOCUMENTS

| | | | |
|---|---|---|---|
| 5,268,817 A | 12/1993 | Miyagawa et al. | |
| 6,005,767 A | 12/1999 | Ku et al. | |
| 6,196,850 B1 | 3/2001 | Dietz et al. | |
| 6,231,371 B1 | 5/2001 | Helot | |
| 6,282,082 B1 | 8/2001 | Armitage et al. | |
| 6,396,687 B1 | 5/2002 | Sun et al. | |
| 6,430,038 B1 | 8/2002 | Helot et al. | |
| 6,437,973 B1 | 8/2002 | Helot et al. | |
| 6,464,195 B1 | 10/2002 | Hildebrandt | |
| 6,477,871 B1 | 11/2002 | Shaw et al. | |
| 6,483,445 B1 | 11/2002 | England | |
| 6,504,707 B1 | 1/2003 | Agata et al. | |
| 6,519,143 B1 | 2/2003 | Goko | |
| 6,519,148 B1 | 2/2003 | Nakagawa et al. | |
| 6,654,234 B1 | 11/2003 | Landry et al. | |
| 6,717,798 B1 | 4/2004 | Bell et al. | |
| 6,774,870 B1 | 8/2004 | Mead, Jr. et al. | |
| 6,856,506 B1 | 2/2005 | Doherty et al. | |
| 6,873,521 B1 | 3/2005 | Landry | |
| 6,912,121 B1 * | 6/2005 | Karidis et al. ............. | 361/681 |
| 2003/0142474 A1 | 7/2003 | Karidis et al. | |
| 2004/0057197 A1 | 3/2004 | Hill et al. | |
| 2005/0041380 A1 * | 2/2005 | Jeong | |
| 2005/0052833 A1 | 3/2005 | Tanaka et al. | |

FOREIGN PATENT DOCUMENTS

| | | |
|---|---|---|
| JP | 07-049725 | 2/1995 |
| JP | 10-055227 | 2/1998 |
| JP | 2000-228128 | 8/2000 |
| JP | 2002-222026 | 8/2002 |
| JP | 2003-044169 | 2/2003 |

* cited by examiner

*Primary Examiner*—Yean-Hsi Chang
(74) *Attorney, Agent, or Firm*—Blakely Sokoloff Taylor & Zafman, LLP

(57) ABSTRACT

An electronic device implemented with a display and a body case formed by a first body and a second body. The electronic device comprises a hinge and a shaft. The hinge is rotationally coupled to the first body and the second body. The shaft has a first end coupled to the body case and a second end coupled to the display housing. The shaft is adapted to horizontally rotate and translate the display to enable vertical rotation of the display and the second body by the hinge.

20 Claims, 6 Drawing Sheets

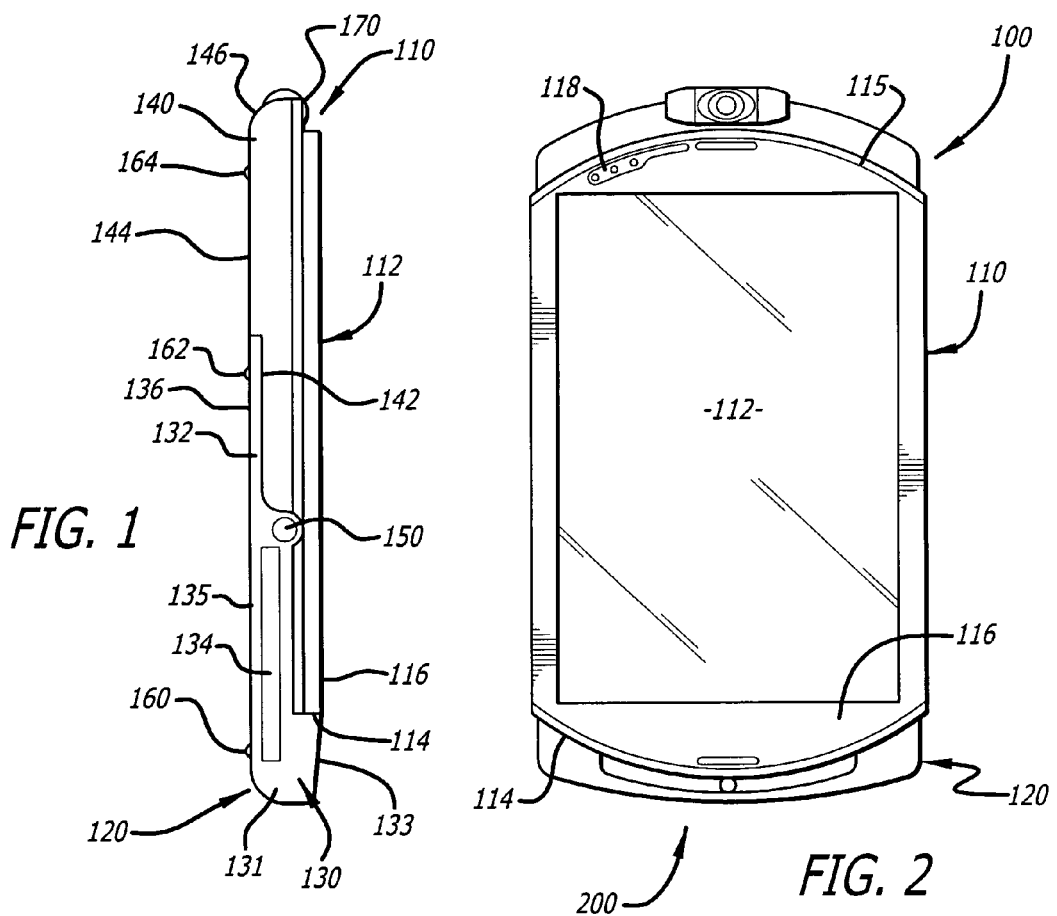
FIG. 1
FIG. 2
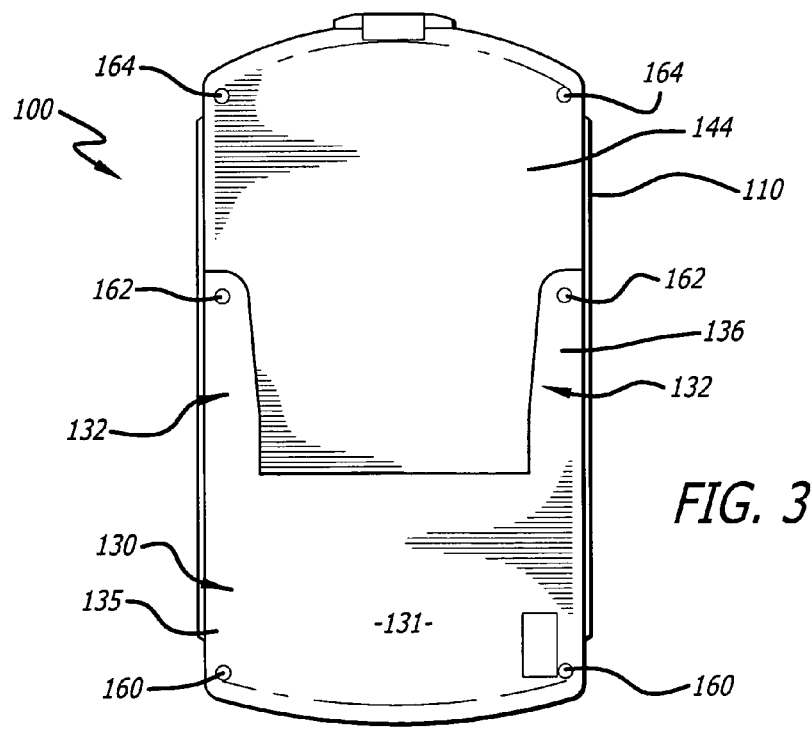
FIG. 3

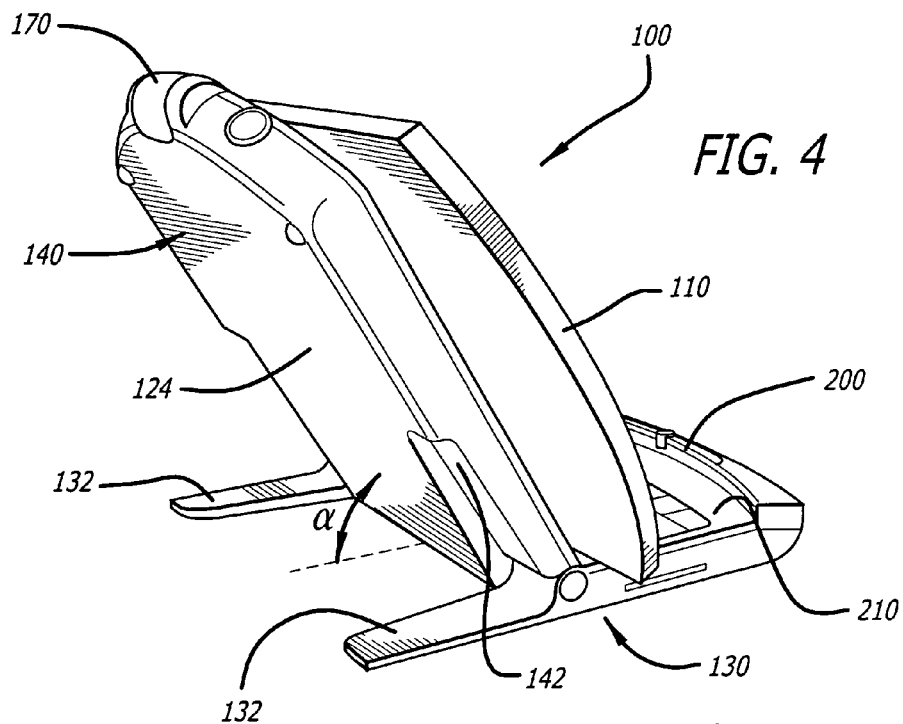
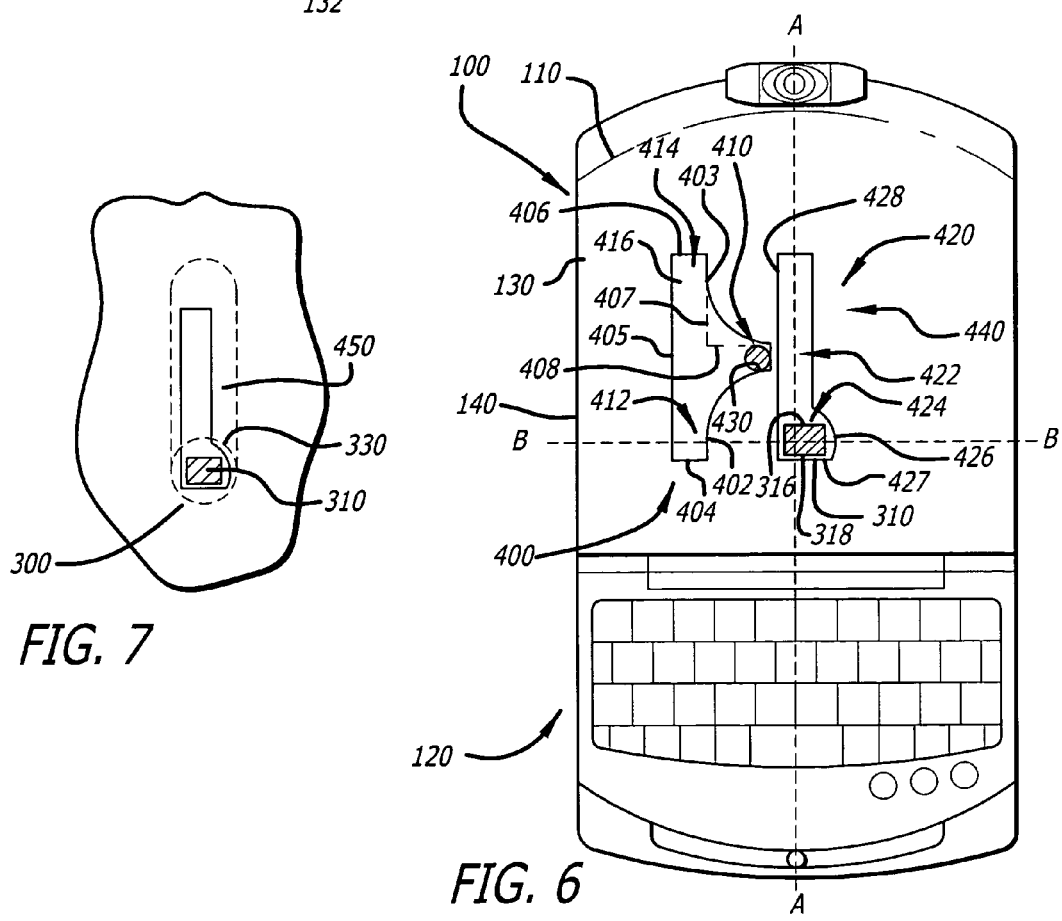

MECHANISM FOR ADJUSTING A DISPLAY

FIELD

Embodiments of the invention generally relate to the field of electronics. More specifically, embodiments of this invention relate to a mechanism adapted to enable both horizontal and vertical rotation of a display of an electronic device.

GENERAL BACKGROUND

Over the past few years, there has been increased demand for portable computers, especially in light of their enhanced data processing functionality. Operating from either external or portable power sources, conventional portable computers feature a liquid crystal display (LCD) connected to and mounted on a body case with an integrated keyboard.

According to one type of conventional portable computer, the LCD is rotationally attached to the body case along a vertical axis of rotation. For instance, the LCD is rotationally attached to the body case by a cylindrical shaft as described in a published Japanese Application No. JP-A-10-55227. Therein, the shaft operates as a conduit for a display cable that electrically connects the LCD to circuitry within the body case. As a result, the computer can generally operate either as a tablet computer when the LCD is positioned directly above the body case or as a laptop computer when the LCD is rotated and now offset from the body case.

One disadvantage associated with this conventional portable computer is that the LCD only faces upward relative to the body case. Hence, in order to review information displayed on the LCD, the user must either look down at the LCD from above or tilt the entire electronic device so that the LCD is placed at a selected viewing angle.

According to another type of conventional portable computer, the LCD is attached to the body case by mechanical guides. These guides are positioned on opposite sides of the body case and are in contact with the edges of the LCD. When laterally moved along these guides, the LCD remains generally in parallel with the body case. Alternatively, a topside of the LCD may be raised as the bottom side of the LCD is moved within the mechanical guides.

One disadvantage associated with this conventional portable computer is that the LCD cannot be adjusted along a vertical axis. Thus, the orientation of the LCD relative to the body case cannot be angularly altered. Moreover, the LCD cannot be rotated along a horizontal axis and placed in multiple viewing angles.

BRIEF DESCRIPTION OF THE DRAWINGS

Features and advantages of embodiments of the invention will become apparent from the following detailed description in which:

FIG. 1 is a side view of an exemplary embodiment of an electronic device placed in a TABLET position.

FIG. 2 is an overhead view of the electronic device of FIG. 1.

FIG. 3 is a perspective view of the bottom sides of the electronic device of FIG. 1.

FIG. 4 is a perspective view of electronic device of FIG. 1 placed in a SELF-SUPPORTING position.

FIG. 6 is an overhead view of an exemplary embodiment of the electronic device placed in the TABLET position.

FIG. 7 is an exemplary embodiment of multiple layers of the interconnect area within the body case of the electronic device.

DETAILED DESCRIPTION

Figure 5B:
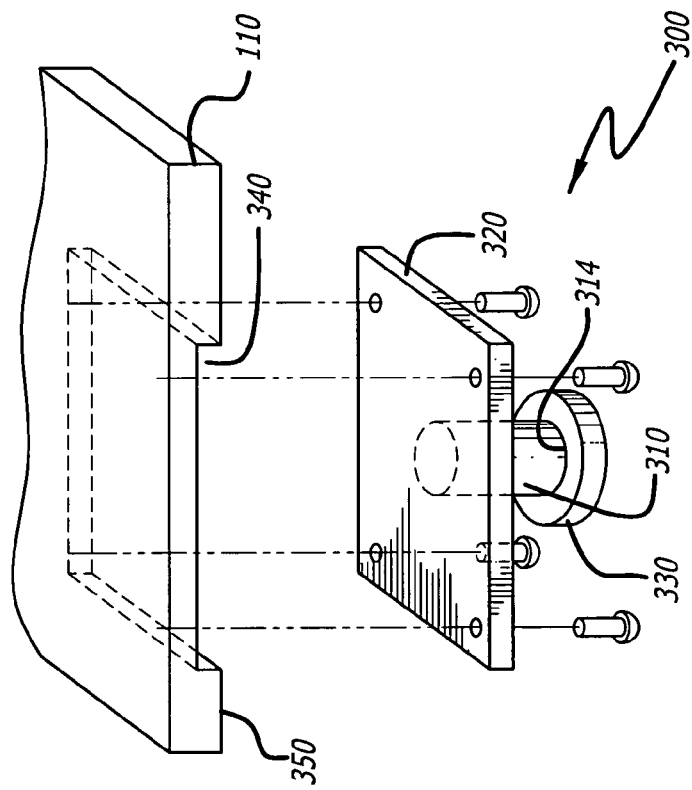
FIGS. 5A–5B are exploded views of exemplary embodiments of the coupling member adapted to be interposed between the display and body case of the electronic device.

Embodiments of the invention set forth in the following detailed description generally relate to an electronic device with a mechanism that permits vertical rotation of the display to be varied at will. The assembly also permits horizontal rotation and translation of the display that is mounted on top of the body case. The mechanism comprises a hinge and a coupling member described below.

In the following description, certain terminology is used to describe various features of one or more embodiments of the invention. For instance, an "electronic device" is defined as an electronic product with a flat panel display that can be rotated and translated. In this detailed description, for clarity sake, the electronic device is illustrated as a hand-held tablet computer that can be converted to a free-standing, portable computer. However, it is evident that the invention may be utilized in other types of electronic devices including, but not limited or restricted to personal digital assistants, cellular telephones, digital cameras, video cameras, navigation systems, and the like.

Herein, the term "rotate" as well as varying tenses thereof is generally defined as the angular movement about an axis of rotation. The axis of rotation may be relatively fixed to the overall orientation of the electronic device. For this detailed description, when used to denote a direction of rotation, the term "vertically rotate" (or any tense thereof) relates to rotation about a generally horizontal axis of rotation. Similarly, the term "horizontally rotate" (or any tense thereof) relates to rotation about a generally vertical axis of rotation. The terms "translate", "translation" or any tense thereof are defined as linear movement.

The term "interconnect" is any medium that is capable of transferring electrical signals from one point to another. Examples of an interconnect may include one or more electrical wires, any type of cable (e.g., flexible printed cable), optical fiber, or the like. A "display interconnect" is simply an interconnect coupled at one end to a display such as a flat panel display.

I. General Architecture

Referring to FIG. 1, a side view of an exemplary embodiment of an electronic device 100 placed in a TABLET position is shown. Herein, the electronic device 100 comprises a display 110 placed in a first position and rotationally mounted on a body case 120 through a coupling member (not shown). Herein, the electronic device 100 operates as a tablet computer with the display 110 placed in a first (portrait) position.

More specifically, the display 110 contains a flat panel display 112 as well as all or part of the circuitry for generating a displayable image on the flat panel display 112. Examples of a flat panel display 112 include, but are not limited or restricted to a liquid crystal display (LCD), a plasma display or the like.

In accordance with this embodiment, the body case 120 comprises a first body 130 and a second body 140 rotationally coupled together by a hinge 150. The hinge 150 may be adapted as any type of friction hinge such as a brake hinge for example. This allows the second body 140 to be vertically rotated and maintained in any selected angle of rotation ($\alpha$, where $0° \leq \alpha \leq 90°$). It is contemplated, however, that the hinge 150 need not include brake hinges when there is no need for maintaining the second body 140 at an angled orientation.

The first body 130 comprises a base 131 and one or more protrusions 132 extending from the base 131. The base 131 is configured with a raised area 133 contoured to be complementary with a curvature of an edge 114 of the flat panel display 112. Also, the top surface of the raised area 133 may be generally flush with a top surface 116 of the display 110.

The base 131 is also adapted with a memory interface 134. The memory interface 134 may be adapted as a bay or communication port to receive a portable memory device such as one or more of the following: a memory card (e.g., PCMCIA card), a digital versatile disc (DVD), a compact disc (CD), a digital tape, or a floppy disk.

The protrusions 132 extend under recessed portions 142 of the second body 140. For instance, according to one embodiment of the invention, the protrusions 132 approximately extend up to a latitudinal center of the second body 140.

A first grommet pair 160 is positioned on a bottom surface 135 of the base 131. Moreover, a second grommet pair 162 is positioned on a bottom surface 136 of the protrusions 132. These grommets 160 and 162 prevent sliding of the electronic device 100 when the electronic device 100 is used on a table or other flat surface.

The second body 140 may be rotated about an axis of rotation established by the hinge 150 after the display 110 has been appropriately rotated and translated as shown below. A pair of grommets 164 is positioned on a bottom surface 144 of the second body 140. Optionally, a camera 170 may be rotationally coupled along an end 146 of the second body 140. This rotational coupling may be accomplished by a friction hinge, which would maintain the camera 170 facing in a direction manually set by the user.

Referring now to FIG. 2, an overhead view of the electronic device 100 is shown. Herein, the flat panel display 112 of the display 110 is mounted on the body case 120 in a stacked arrangement. The electronic device 100 operates as a portable tablet computer.

For this embodiment of the invention, the display 110 is configured in an oblong shape having a concave curvature at edge 114 and a convex curvature at edge 115. In this position, the display 110 covers at least seventy percent of a footprint of the body case 120, including a keyboard (not shown) integrated into the first body 130, and perhaps a cursor control device 200.

As shown in FIG. 2, one or more hot keys 118 are integrated near an edge 115 of the display 110. A "hot key" is a recessed area that, when activated, causes a task to be more quickly performed than by selecting entries from menus via the cursor control device 200. These tasks can be specified and programmed at manufacture or can be programmed by the user. Examples of tasks controlled by the hot keys 118 include starting an application, establishing network connectivity, commencing a power-down procedure, or the like.

Referring to FIG. 3, a perspective view of the bottom sides 135, 136 and 144 of the electronic device 100 are shown. The first body 130 is configured with the protrusion 132 that are used to provide stability when the display 110 is rotated or translated as shown in FIG. 4. The base 131 is sized to provide sufficient support for the display 110 when the electronic device 100 is placed in a SELF-SUPPORTING position. The grommet pairs 160 and 162 are positioned on opposite sides of the first body 130 and spaced appropriately to reduce skid during use.

Referring now to FIG. 4, a perspective view of electronic device 100 placed in a SELF-SUPPORTING position is shown. Herein, the second body 140 is vertically rotated by an angle of rotation ($\alpha$). Such rotation is performed after the display 110 has been horizontally rotated and translated toward the camera 170 and placed in a second position as described below in detail. Hence, the cursor control device 200 and the keyboard 210 are fully accessible by the user.

The second body 140 comprises the recessed portions 142, which are sized to accommodate protrusions 132 of the first body 130. As a result, the collective bottom surfaces of the bodies 130 and 140 are substantially planar when the electronic device 100 is placed in the TABLET position as shown in FIG. 1.

Figure 5A:
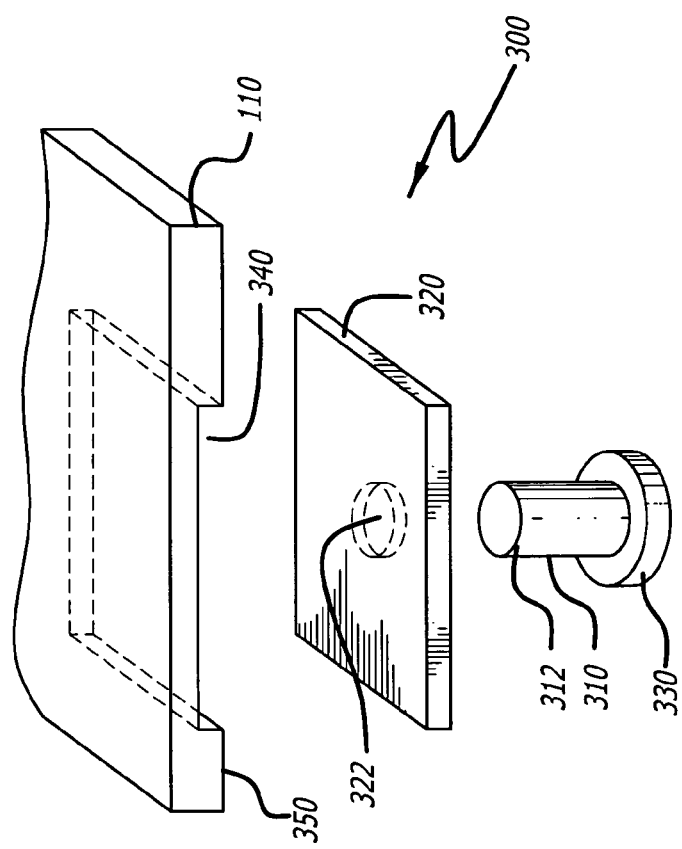

Referring now to FIGS. 5A–5B, exploded views of exemplary embodiments of a coupling member 300 are shown. Of course, the coupling member 300 may be produced in a variety of physical configurations other than those illustrated. Regardless of its configuration, the coupling member 300 is configured to enable the display 110 to be rotated and translated over the body case 120.

For each of the embodiments illustrated in FIGS. 5A–5B, the coupling member 300 comprises a shaft 310 interconnecting a fastening element 320 and a securing element 330. Both the shaft 310 and elements 320 and 330 may be made of a rigid composition such as hardened plastic, metal, or the like. The shapes of the fastening and securing elements 320 and 330 are a design choice.

According to one embodiment of the invention, as shown in FIG. 5A, the shaft 310 and securing element 330 are formed together as the same element. The shaft 310 comprises a first end 312 adapted for coupling to the fastening element 320. For instance, the first end 312 may be sized and configured for insertion into a cavity 322 of the fastening element 320, and thereafter, retained by the fastening element 320.

As an example, the first end 312 may be a "snap-in" insert that is adapted to mate with a complementary female cavity 322 located on the fastening element 320. Alternatively, as another example, the first end 312 may be coupled to the fastening element 320 by another conventional coupling technique such as threads, welding, gluing, or the like.

According to another embodiment of the invention, as shown in FIG. 5B, the shaft 310 and fastening element 320 may be formed together as a single element. The shaft 310 comprises a second end 314 that is coupled to the securing element 330 by utilizing any coupling technique. Of course, it is contemplated that the shaft 310 and elements 320, 330 may be configured as a single molded element as well.

Herein, as further shown in both FIGS. 5A and 5B, the fastening element 320 is adapted for insertion into a socket 340 generally formed at the center of a bottom surface 350 of the display 110. The socket 340 is formed to securely retain the fastening element 320 inserted therein (FIG. 5A). Otherwise, additional fasteners (e.g., screws, rivets, etc.) may be used (FIG. 5B). Thus, the display 110 is rotated and translated in response to rotation and translation of the coupling member 300.

of course, it is contemplated that the fastening element 320 may be integrated into the display 110 or preformed as part of the display 110. For these embodiments, the coupling member 300 would comprise the shaft 310 adapted to the fastening element 320 (or display 110) and the securing element 330.

Referring to FIG. 6, an overhead view of an exemplary embodiment of the electronic device 100 placed in the TABLET position is shown. Herein, the body case 120 comprises a first opening 400 and a second opening 420 forming an interconnect area 440. These openings 400 and 420 are situated within the second body 140 so that a substantial portion of the second opening 420 is approximately positioned at a longitudinal center of the body case 120.

For this embodiment of the invention, the first opening 400 is adapted as a conduit for a display interconnect 430, which is used to electrically couple the flat panel display with circuitry (e.g., digital-to-analog converter, processor, chipset, memory, etc.) housed within the body case 120. The first opening 400 includes a plurality of perimeter edges 402–406, which collectively form three interconnect retention areas 410, 412 and 414. A channel 416 is formed between retention areas 412 and 414.

As described herein, the display interconnect 430 resides in the retention area 410 when the electronic device is placed in the TABLET position. The display interconnect 430 resides in retention areas 412 and 414 when the display 110 is rotated and translated from its portrait orientation.

For this embodiment of the invention, the first perimeter edge 402 is configured with a convex curvature, shaped as an arc, to provide a smooth transition of the display interconnect 430 between retention areas 410 and 412. It is contemplated that the radius of the arc may be equal to the distance between the center of the body case 130 and the display interconnect 430. However, in other embodiments, the radius of the arc may be sized differently.

Herein, the second perimeter edge 403 is configured with an arc shaped curvature that is a mirror image of the first perimeter edge 402. However, it is contemplated that the second perimeter edge 403 may be substituted for generally straight perimeter edges 407 and 408 as represented by dashed lines.

The other perimeter edges 404–406 generally form the channel 416 over which the display interconnect 430 can be moved between the second retention area 412 and the third retention area 414 as described below.

Referring still to FIG. 6, the second opening 420 is shaped to limit the angle of rotation and translation of the shaft 310 of the coupling member 300. For this embodiment of the invention, the second opening 420 is keyhole-shaped with a linear channel portion 422 and an expanded portion 424 positioned adjacent to one end of the channel portion 422. In one embodiment of the invention, the expanded portion 424 is positioned at the center of the body case 120.

Defined by perimeter edges 426, 427 and a portion of perimeter edge 428, the expanded portion 424 is generally wider than the channel portion 422. This allow for rotation of the display 110 when the shaft 310 is rotated.

For this embodiment of the invention, the shaft 310 has a rectangular cross-sectional area having a length (L) exceeding the width of the channel portion 422 and a width (W) slightly less than the width of the channel portion 422. The positioning and shape of the shaft 310 are selected to restrict rotation and translation of the display 110 attached thereto. For instance, when the shaft 310 is situated in a "lengthwise" orientation as shown, translation of the coupling member 300 is precluded because a first side 316 of the shaft 310, perpendicular to a translation path, exceeds the width of the channel portion 422.

As further shown in FIG. 6, the cross-sectional shape of the shaft 310 along with the shape of the perimeter edge 426 enable counter-clockwise (CCW) rotation of the shaft 310 by approximately ninety degrees (90°). Any rotation beyond ninety degrees (excluding a few degrees for tolerance) is precluded since the first side 316 of the shaft 310 would come into contact with the perimeter edge 428. Similarly, the cross-sectional shape of the shaft 310 discourages CW rotation of the display 110 when the electronic device 100 is placed in the TABLET position. Normally, a second side 318 of the shaft 310 will come into contact with perimeter edge 427 upon commencement of such rotation (e.g., prior to completion of ten degrees of CW rotation).

Referring now to FIG. 7, an exemplary embodiment of multiple layers of the interconnect area 440 within the body case 120 is shown. The interconnect area 440 features a guide 450 configured within the second body 140. The guide 450 has a depth less than the length of the shaft 310 of the coupling member 300. As a result, the shaft 310 protrudes from the second opening 420 of the body case 120. The guide 450 is configured not only to retain the securing element 330 within the body case 120, but also to permit rotation of the coupling member 300 at a single position and translation of the coupling member 300.

For instance, according to one embodiment, the guide 450 comprises a channel portion of equal width so that the size of opening 420 prohibits horizontal rotation of the coupling member 300. According to another embodiment of the invention, however, the cross section of the shaft 310 may be being wider than a width of the channel portion when the display is placed in the first position. Moreover, the cross section of the shaft 310 may be narrower than the width of the channel portion when the display is placed in the second position. A first end of the guide 450 may enable limited rotation of the coupling member 300, in particular the shaft 310 and securing element 330, with the cross section of the shaft 310 being narrower than a diameter of the first end of the guide 450.

Figure 8:
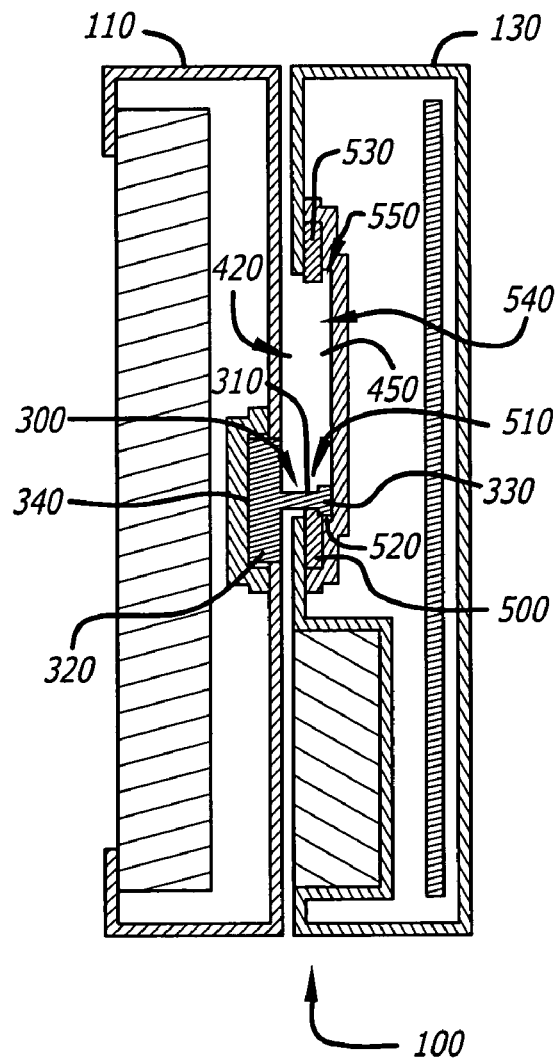
FIG. 8 is a cross-sectional view of the electronic device of FIG. 6 along a cross-sectional line A—A.

Referring now to FIG. 8, a cross-sectional view of the electronic device 100 of FIG. 6 along a cross-sectional line A—A is shown. Herein, the fastening element 320 of the coupling member 300 is inserted into the socket 340 and coupled to the display 110. Therefore, any rotation or translation of the coupling member 300 causes corresponding rotation or translation of the display 110.

As shown, the second opening 420 constitutes an opening for the guide 450 configured to enable rotation and translation of the coupling member 300. According to one embodiment of the invention, the guide 450 comprises a first retention element 500 situated at a first end 510 of the guide 450. The first retention element 500 provides a recess 520.

When the electronic device 100 is placed in the TABLET position, the securing element 330 is partially inserted into the recess 520. The recess 520 is sized so that the first retention element 500 applies a downward force against the securing element 330. As a result, the coupling member 300 is maintained in this position even during rotation of the display 110. The securing element 330 is disengaged from the recess 520 only when lateral forces are applied to translate the display 110.

As shown, the guide 450 further comprises a second retention element 530 situated at a second end 540 of the guide 450. The second retention element 530 is generally identical in construction to the first retention element 500 and provides a recess 550 sized to receive the securing element 330 of the coupling member 300.

Figure 9:
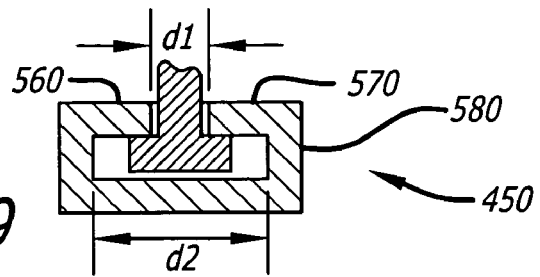
FIG. 9 is a cross-sectional view of a guide positioned within the second body of FIG. 8 along a cross-sectional line B—B.

As shown in FIG. 9, a cross-sectional view of the guide 450 positioned within the second body 140 of FIG. 8 along a cross-sectional line B—B is shown. Two flanges 560 and 570 may be attached to sidewalls 580 of the guide 450. These flanges 560 and 570 extend inward toward each other so that the distance (d1) between flanges 560 and 570 is wider than any side of the shaft 310, most notably a cross-sectional length of the shaft 310. The distance (d2) between sidewalls 580 of the guide 450 is of sufficient length to allow rotation of the securing element 330, but prevents unwanted lateral movement (i.e., rocking) of the coupling member 300.

II. Modes of Operation

FIGS. 10–15 illustrate exemplary embodiments of the electronic device 100 being transformed from use as a tablet PC to a portable computer. This is accomplished through rotation and translation of the display 110 as described below.

Figure 10:
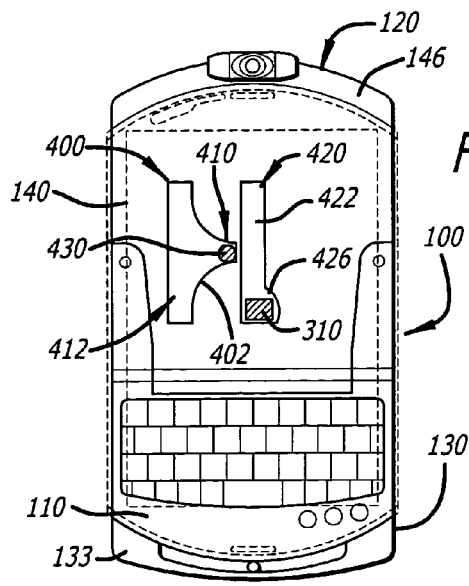
FIG. 10 is an exemplary embodiment of the electronic device placed in a TABLET position for illustration of the operations for placement into a SELF-SUPPORTING position.

Referring now to FIG. 10, an exemplary embodiment of the electronic device 100 placed in a TABLET position is shown. Herein, the display 110 is mounted on the body case 120 via the coupling member and covers almost the total footprint of the body case 120, excluding the raised area 133 of the first body 130 and an area along the end 146 of the second body 140. The display 110 covers at least one-half of the footprint of the first body 130 and one-half of the footprint of the second body 140. As shown, over seventy percent (70%) of each of these footprints is covered. Of course, it is contemplated, however, that the display 110 may be configured to cover any of these areas 133 and 146 as well.

Figure 11:
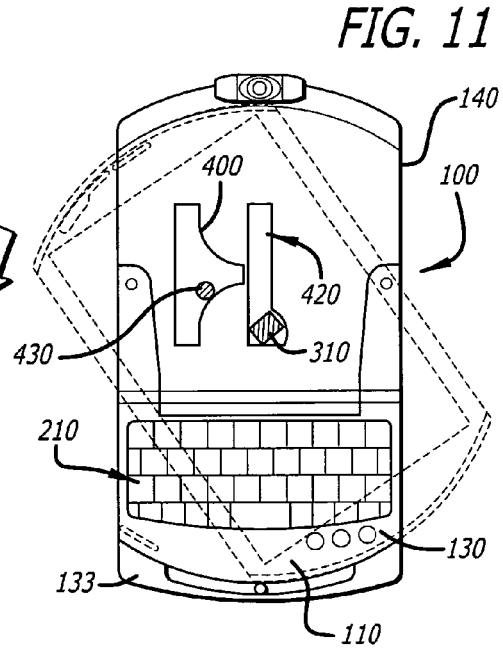
FIG. 11 is an exemplary embodiment of the electronic device being rotated for illustration of the operations for placement into a SELF-SUPPORTING position.

As shown in FIG. 11, the display 110 is horizontally rotated. Herein, the keyboard 210, integrated into the first body 130, is partially exposed. In addition, more surface area of the second body 140 is exposed, while the first and second openings 400 and 420 still remain covered by the display 110.

Figure 12:
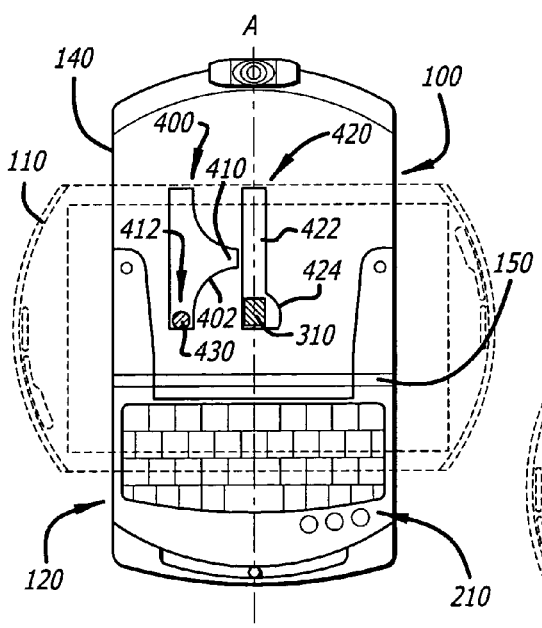
FIG. 12 is an exemplary embodiment of the electronic device being placed in the INTERMEDIARY position for illustration of the operations for placement into a SELF-SUPPORTING position.

Referring now to FIG. 12, an overhead view of an exemplary embodiment of the electronic device 100 placed in an INTERMEDIARY position is shown. Herein, the display 110 is now substantially orthogonal to its orientation when the electronic device 100 was in the TABLET position. As shown, the display 110 is placed in a third position and substantially centered over the body case 120 and continues to cover the hinge 150, which precludes vertical rotation of the second body 140. However, a portion of the keyboard 210 is visible.

After rotation of the display 110 by approximately ninety degrees (90°) in the CCW direction, the display interconnect 430 has moved along the first perimeter edge 402 of the first opening 400 from the first retention area 410 to the second retention area 412.

In addition, the coupling member still remains in the expanded portion 424 of the second opening 420 despite being rotated by ninety degrees (90°) in the CCW direction. In particular, the shaft 310 is rotated accordingly, and therefore, is now situated in a "width-wise" orientation where none of the sides of the shaft 310 that are perpendicular to the linear channel portion 422 exceed the width of the channel portion 422.

Figure 13:
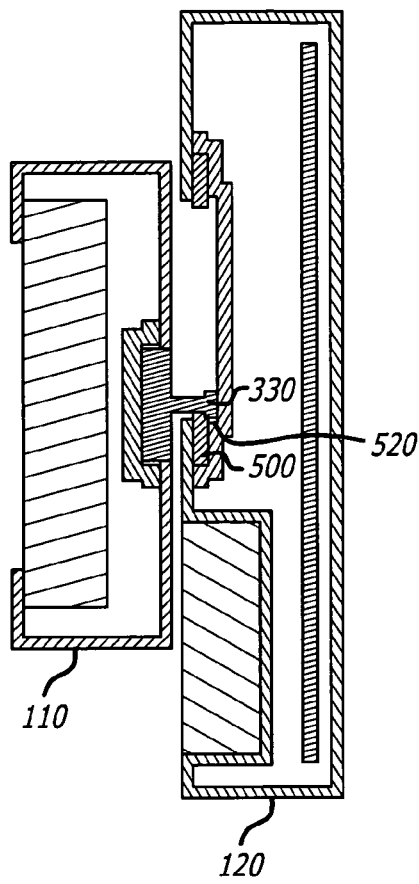
FIG. 13 is a cross-sectional view of the electronic device of FIG. 12 along a cross-sectional line A—A.

Referring to FIG. 13, a cross-sectional view of the electronic device of FIG. 12 along a cross-sectional line A—A is shown. Herein, the securing element 330 is rotated, but is still retained within the recess 520 formed by the first retention element 500.

Figure 14:
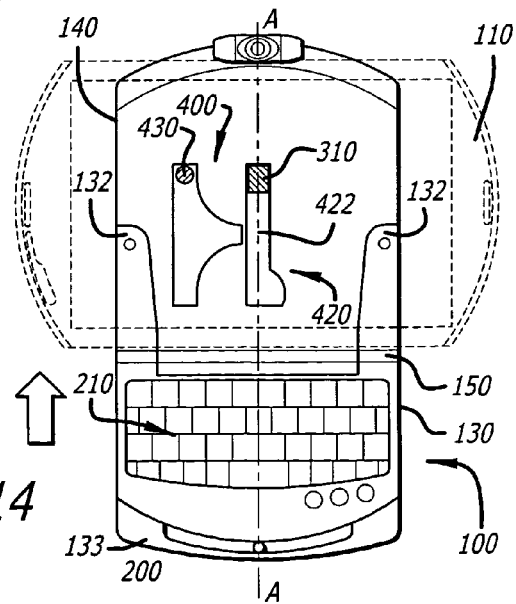
FIG. 14 is an exemplary embodiment of the electronic device being placed in the SELF-SUPPORTING position for illustration of the operations performed on the electronic device.

Referring to FIG. 14, an exemplary embodiment of the electronic device 100 placed into the SELF-SUPPORTING position is shown. In general, the display 110 is adjusted by moving the coupling member along the channel portion 422 of the second opening 420. As a result, the display 110 is positioned to clear the hinge 150 and exposes the entire first body 130, including the cursor control device 200 and keyboard 210. This enables the second body 140, along with the display 110, to be vertically rotated in accordance with the hinge 150. During such rotation, the protrusions 132 of the first body 130 would operate as legs in balancing and maintaining angled positioning of the display 110. Also, they prevent the second body 140 from being improperly inverted.

Figure 15:
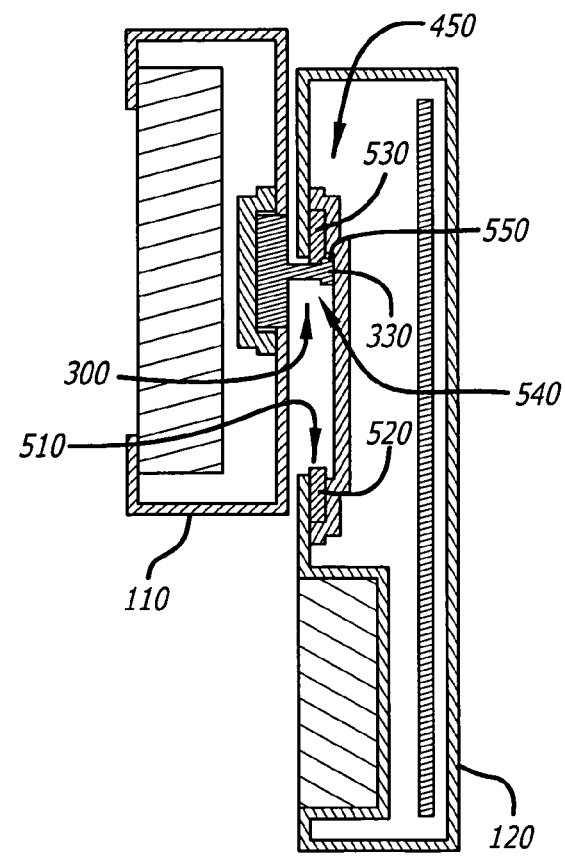
FIG. 15 is a cross-sectional view of the electronic device of FIG. 14 along cross-sectional line A—A.

Referring now to FIG. 15, a cross-sectional view of the electronic device 100 of FIG. 14 along cross-sectional line A—A is shown. Herein, the securing element 330 of the coupling member 300 becomes disengaged from the recess 520. The coupling member 300 is moved from the first end 510 to the second end 540 of the guide 450. Thereafter, the securing element 330 is inserted into the second recess 550 formed by the second retention element 530.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An electronic device, comprising:
    a hinge;
    a body case having a first portion and a second portion, the second portion being coupled to the first portion by the hinge and adapted to be vertically rotated;
    a display mounted over the body case, the display being placed in a first position to prevent the vertical rotation of the second portion, and placed in a second position to enable vertical rotation of the second portion relative to the first portion; and
    a coupling member coupled to the body case and the display, the coupling member being adapted to horizontally rotate and translate the display between the first position and the second position.

2. The electronic device according to claim 1, further comprising a keyboard deployed within the first portion, the keyboard being covered by the display when placed in a TABLET position and being partially covered by the display when the display placed in the first position.

3. The electronic device according to claim 2, wherein the display is horizontally translated by the coupling member between the first position and the second position where the keyboard is fully exposed.

4. The electronic device according to claim 1, wherein the coupling member includes a shaft, and the second portion of the body case includes a guide in which the shaft is slidably inserted.

5. The electronic device according to claim 4, wherein the guide is positioned under an opening in the second portion of the body case that is sized to permit rotation of the shaft only in one rotational direction.

6. The electronic device according to claim 1, wherein the first portion of the body case includes a plurality of protrusions extending under a corresponding plurality of recessed areas in the second portion of the body case.

7. The electronic device according to claim 6, wherein the plurality of protrusions of the first portion of the body case extends to a latitudinal center of the second portion of the body case.

8. The electronic device according to claim 6, wherein the plurality of protrusions of the first portion operate as legs in balancing and maintaining both the display and the second portion at an angled position after vertical rotation.

9. The electronic device according to claim 1, wherein a footprint of the display is greater than each footprint of the first portion and the second portion and less than a total footprint of the first portion and the second portion.

10. An electronic device implemented with a display and a first body and a second body forming a body case, comprising:
a hinge rotationally coupled to the first body and the second body; and
a coupling member coupled to the display and the body case, the coupling member comprises
a guide having a channel portion, and
a shaft guided by the guide, a cross section of the shaft being wider than a width of the channel portion when the display is placed in a first position, and being narrower than the width of the channel portion when the display is placed in a second position; and
wherein the display is positioned in (1) the first position to cover the hinge and a substantial portion of the first body and second body, and (2) the second position to partially cover only the second body.

11. The electronic device according to claim 10, wherein the shaft is further adapted to support the display in a third position covering the hinge and a portion of the first body and second body being lesser in area than the substantial portion of the first body and second body covered by the display when in the first position.

12. The electronic device according to claim 11, wherein the display is horizontally rotated by ninety degrees and translated by shifting the display toward an edge of the second body opposite an edge of the second body coupled to the hinge.

13. The electronic device according to claim 12, wherein the display is in the third position after being horizontally rotated to be substantially orthogonal to the first position.

14. The electronic device according to claim 10, wherein the shaft includes a fastener element positioned at one end of the shaft and a securing element positioned at the other end of the shaft.

15. The electronic device according to claim 10, wherein the hinge vertically rotates the second body and the display after the display has been placed in the second position and maintains the second body and the display at a selected angle.

16. An electronic device implemented with a display and a first body and a second body forming a body case, comprising:
a hinge rotationally coupled the first body and the second body; and
a coupling member coupled to the second body and the display, the coupling member adapted to horizontally rotate and translate the display to enable vertical rotation of both the display and the second body by the hinge.

17. The electronic device according to claim 16, wherein the coupling member is adapted to support the display in (1) a first position covering the hinge and more than one-half of a footprint of each of the first body and the second body, and (2) a second position only covering more than one-half of a footprint of the second body.

18. The electronic device according to claim 17, wherein the coupling member is further adapted to support the display in a third position covering the hinge and partially covering a portion of the first body and the second body.

19. The electronic device according to claim 17, wherein the display is in the first position when the electronic device is in a TABLET position and is in the second position when the electronic device is in a SELF-SUPPORTING position after being horizontally rotated and translated.

20. The electronic device according to claim 19, wherein the display is in the second position after the display is horizontally rotated to be substantially orthogonal to an orientation of the display when the electronic device is in the TABLET position.

* * * * *